(12) United States Patent
Rompel

(10) Patent No.: US 7,520,703 B2
(45) Date of Patent: Apr. 21, 2009

(54) TWIST DRILL WITH A PILOT TIP

(75) Inventor: Markus Rompel, Runkel/Schadeck (DE)

(73) Assignee: Black & Decker Inc., Newark, DE (US)

( * ) Notice: Subject to any disclaimer, the term of this patent is extended or adjusted under 35 U.S.C. 154(b) by 416 days.

(21) Appl. No.: 11/268,701

(22) Filed: Nov. 7, 2005

(65) Prior Publication Data
US 2006/0056930 A1    Mar. 16, 2006

Related U.S. Application Data

(63) Continuation-in-part of application No. 10/935,398, filed on Sep. 7, 2004, now Pat. No. 7,267,514.

(51) Int. Cl.
*B23B 51/02* (2006.01)
(52) U.S. Cl. ...................... 408/225; 408/230
(58) Field of Classification Search ......... 408/223–225, 408/227, 229, 230; *B23B 51/02*
See application file for complete search history.

(56) References Cited

U.S. PATENT DOCUMENTS

| | | | | |
|---|---|---|---|---|
| 2,193,186 | A | * | 3/1940 | Bannister .................. 408/223 |
| 2,936,658 | A | * | 5/1960 | Riley ..................... 408/230 |
| 3,559,513 | A | | 2/1971 | Hougen |
| 3,609,056 | A | | 9/1971 | Hougen |
| 3,648,508 | A | | 3/1972 | Hougen |
| 3,825,362 | A | | 7/1974 | Hougen |
| 4,605,347 | A | * | 8/1986 | Jodock et al. ............... 408/224 |
| 5,288,183 | A | * | 2/1994 | Chaconas et al. ........... 408/211 |
| 5,442,979 | A | * | 8/1995 | Hsu ....................... 76/108.6 |
| 5,934,845 | A | | 8/1999 | Frey |
| 6,007,279 | A | | 12/1999 | Malone, Jr. |
| 6,045,302 | A | | 4/2000 | Orr |
| 6,050,754 | A | * | 4/2000 | Thomas .................... 408/230 |
| 6,652,203 | B1 | * | 11/2003 | Risen, Jr. .................. 408/225 |
| 6,705,807 | B1 | | 3/2004 | Rudolph et al. |

(Continued)

FOREIGN PATENT DOCUMENTS

DE    202 03 232    6/2002

(Continued)

*Primary Examiner*—Daniel W Howell
(74) *Attorney, Agent, or Firm*—Harness, Dickey & Pierce, P.L.C.

(57) ABSTRACT

An elongated drill bit has a shank at one end and working end at the other. A flute portion is between the working end and the shank. The flute portion is continuous with the shank and working end and is generally unitarily formed with them. The working end has a pilot tip with a first cutting portion. A second cutting portion is at the terminus of the flute portion and is axially spaced from the pilot tip first cutting portion. The second cutting portion includes a pair of cutting edges on opposing sides of the pilot tip. Each of the second cutting edges is on an angle from about 22° to 27° to a line transverse to the longitudinal axis. The cutting edges are defined by the junction of a rake face, defined by the flute surface, and a primary clearance face. Also, a secondary clearance face may be present which is continuous with the primary face at a different angle. The angle is about 50° to 65° with respect to the longitudinal axis.

11 Claims, 3 Drawing Sheets

U.S. PATENT DOCUMENTS

| | | | |
|---|---|---|---|
| 6,857,832 B2 * | 2/2005 | Nygård | 408/211 |
| 2003/0202853 A1 * | 10/2003 | Ko et al. | 408/225 |
| 2003/0215297 A1 * | 11/2003 | Frisendahl | 408/230 |
| 2004/0191015 A1 | 9/2004 | Kozak | |
| 2005/0053438 A1 | 3/2005 | Wetzl et al. | |

FOREIGN PATENT DOCUMENTS

| | | |
|---|---|---|
| DE | 10130681 | 1/2003 |
| EP | 0 455 420 A2 | 11/1991 |
| EP | 0 522 202 B1 | 3/1995 |
| EP | 1 238 732 | 9/2002 |
| EP | 1 016 480 B1 | 9/2004 |
| FR | 2829715 A1 * | 3/2003 |
| JP | 01140908 A * | 6/1989 |
| JP | 09-225720 | 9/1997 |
| JP | 2003-225819 | 8/2003 |
| SU | 844160 A * | 7/1981 |
| WO | WO 2004/011179 | 2/2004 |

* cited by examiner

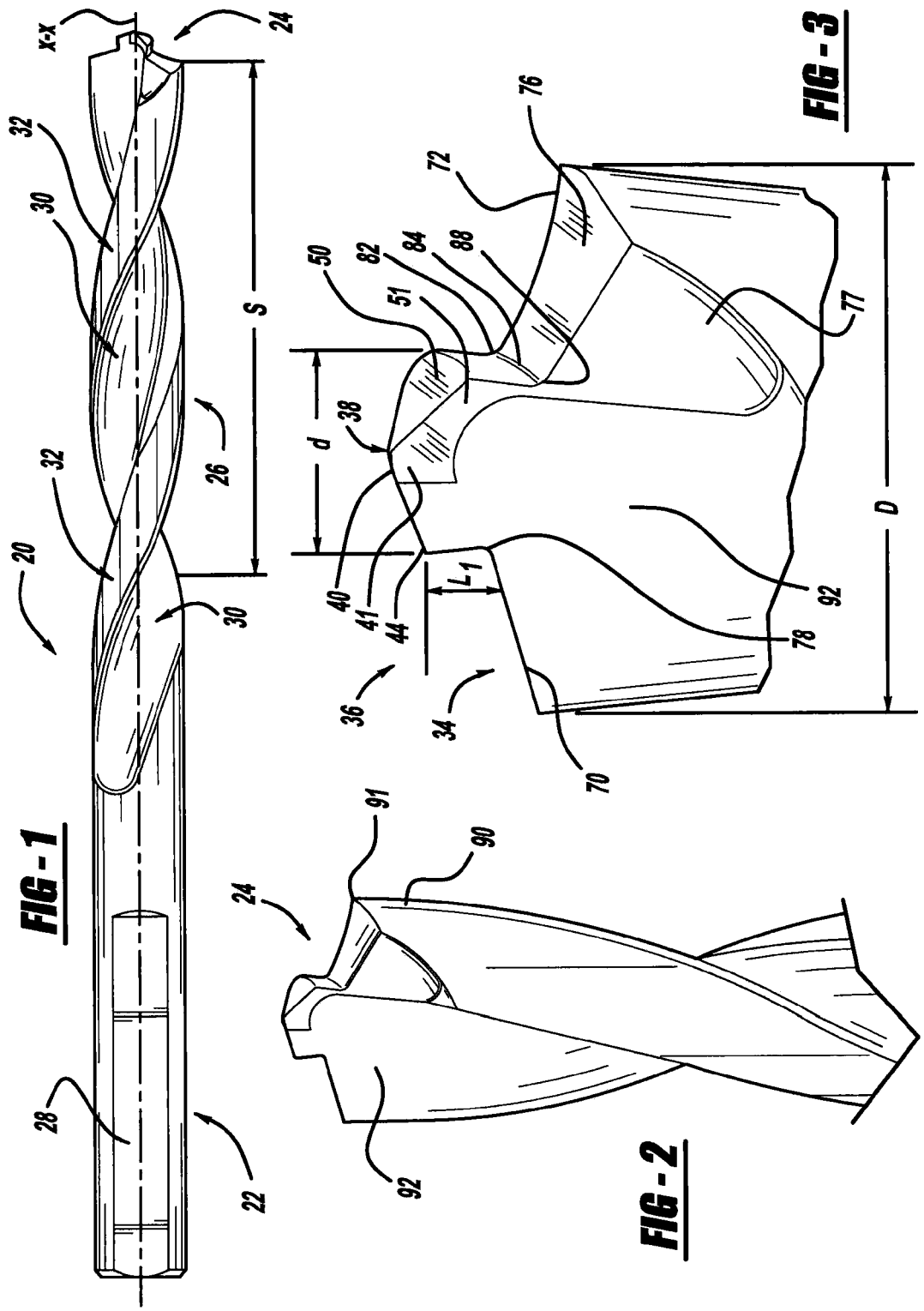

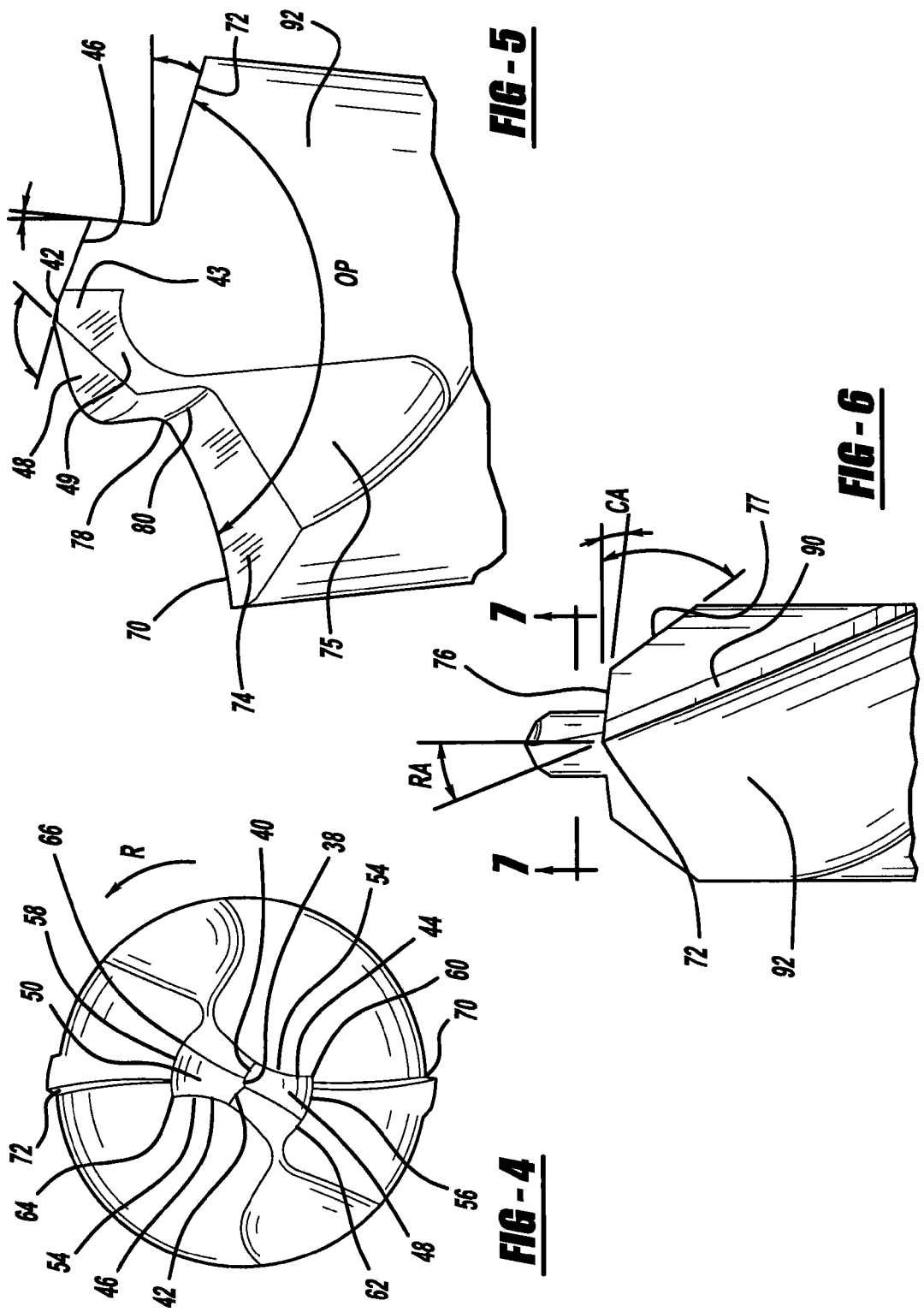

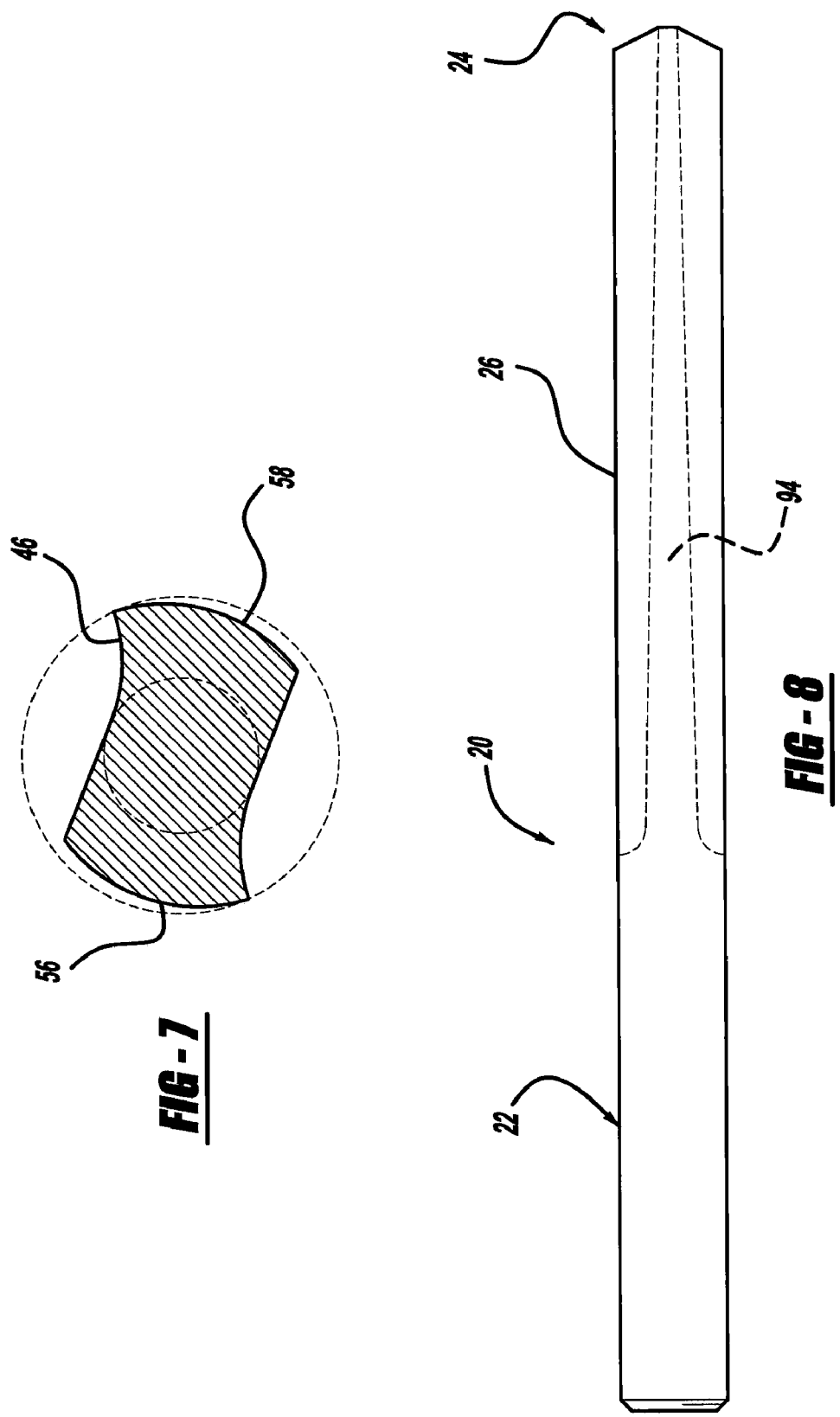

US 7,520,703 B2

TWIST DRILL WITH A PILOT TIP

CROSS-REFERENCE TO RELATED APPLICATIONS

This application is a continuation-in-part of U.S. patent application Ser. No. 10/935,398 filed on Sep. 7, 2004 and entitled "Self-Centering Drill Bit with Pilot Tip. The disclosure of the above application is incorporated herein by reference.

FIELD OF THE INVENTION

The present invention relates to drill bits and, more particularly, to drill bits including a pilot tip to bore through wood, metal and plastics.

BACKGROUND OF THE INVENTION

One of the most commonly used drill bits to drill through metal is a twist drill formed with a chisel end at the working end of the drill bit. The chisel edge is formed perpendicular to the axis of the drill bit and usually extends across the small portion of the drill bit diameter. Also, the chisel edge extends equally on opposite sides of the drill bit axis. A cutting edge extends from each opposite end of the chisel edge and tapers axially rearwardly to the outer periphery of the drill bit diameter. In use, the chisel edge is the first portion of the drill bit to engage a workpiece. The chisel edge engages the workpiece and literally works and extrudes the material in the intermediate vicinity rather than forming chips swarf, sawdust and the like for extraction. A work material enables the drill bit to begin to move into the material of the workpiece whereby the cutting edges begin to cut the material to form removable chips which are discharged via helical flutes running axially rearwardly from the chisel edge and the cutting edges.

While a drill bit with a chisel edge is just satisfactory for some drilling operations, it does not provide holes with accurately located centers or round holes. For example, it tends to skip away from the desired location of the hole as a rotating chisel edge engages the workpiece. Further, in the out of round characteristics of the drill bit or tool holder connected to the shank of the drill bit is transmitted to the working end while drilling the hole.

Patent publication No. EP0315643 discloses a drill bit having a pilot tip which extends axially ahead of an outer cutting portion. The pilot tip has a smaller diameter than the outer cutting portion. In use, the pilot tip cuts a pilot hole which self-centers the drill bit. Next, the outer cutting portion cuts a main hole in the workpiece which corresponds to the diameter of the drill bit.

A drill bit sold by the Applicant under the registered trade mark EXTREME DEWALT™ (hereinafter referred to as the prior art drill bit) also has a pilot tip which extends axially ahead of an outer cutting portion. The pilot tip has a "split point" cutting edge arrangement to cut the self-centering pilot hole and the outer cutting portion has a pair of major cutting edges arranged on opposite sides of the axis to cut the primary hole. The split point has two inner minor cutting edges arranged on opposite sides of the axis. The two inner minor cutting edges are spaced apart and connected at the extreme tip of the split point by a slight chisel edge. The split point also has an outer minor cutting edge that extends from the end of each inner minor cutting edge and tapers axially rearward to the outer periphery of the pilot tip. In use, the two inner minor cutting edges engage a workpiece to initiate the drilling operation slightly in advance of the engagement of the workpiece by the outer minor cutting edges. The chisel edge does not work or extrude the material in its immediate vicinity, like in the case of the common twist drill mentioned above, because the chisel edge is insignificantly small. The chips created by the inner and the outer minor cutting edges are separate from each other and are therefore smaller in size.

Once the pilot tip begins drilling the self-centering pilot hole, the major cutting edges of the outer cutting portion engage the workpiece and create chips which are also separate from those created by the minor cutting edges of the pilot tip. This arrangement produces smaller chips during the drilling operation which, in turn, reduces resistance to the passage of the drill bit through the workpiece as the drilling process progresses. The drill bit has debris channels in the form of a pair of helical flutes to transport the chips away from the cutting edges and out of the hole being drilled in the workpiece. Smaller chips are naturally easier to convey along the flutes and are less likely to clog up the flutes. A clogged flute creates the problem of significantly increased resistance to the passage of the drill bit through the workpiece. Deeper flutes transport such chips and other debris more easily and are less prone to clogging. However, deeper flutes also result in a thinner web that reduces the strength of the dill bit. A compromise is met by a web that tapers radially outwardly and axially rearward from the pilot tip of the working end towards the drill bit shank. This provides deeper flutes in the region of the working end where efficient debris removal is most important. Also, it provides a thicker web towards the shank where robustness is important. The prior art drill bit has a tapering web with a thickness increasing from the tip portion to the shank portion at a uniform taper rate.

SUMMARY OF THE INVENTION

The present invention provides a drill bit which has higher speed, longer life and higher durability. The present invention has a second set of cutting edges which have a lower shoulder angle to reduce grabbing during break through.

According to the invention, an elongated drill bit with a longitudinal axis comprises a shank at one end. A working end is at the other end of the bit. A flute portion is formed between the shank and the working end. The shank, working end, and flute portion are continuous with one another and are generally unitarily formed. The working end comprises a pilot tip with a first cutting portion. A second cutting portion is formed at a terminus of the flute portion axially spaced from the pilot tip first cutting portion. The second cutting portion includes a pair of cutting edges on opposed sides of the pilot tip. Each of the second cutting edges is on angle from a line transverse to the longitudinal axis from about 22° to about 27°. A rake face, defined by a surface of the flute, is adjacent the second cutting edge. A primary clearance face is adjacent the second cutting edge. The cutting edge is formed at the junction of the rake face and the primary clearance face. A secondary clearance face is continuous with the primary clearance face. The secondary clearance face angles with respect to the primary clearance face. The secondary clearance face is on an angle of about 50° to 65° with respect to the longitudinal axis. A clearance face of the first cutting portion is co-planar with the secondary clearance face. The first cutting portion includes a pair of inner and outer cutting edges. The inner cutting edges have a rake face co-planar with the secondary clearance face. The flute surface is on an angle of about 30° to 40° with respect to the longitudinal axis. The primary clearance face is on an angle with respect to a line transverse to the longitudinal axis from about 6° to 12°. Both of the second cutting edges are substantially on a plane which passes through the longitudinal axis.

Further, according to the invention, an elongated drill bit with a longitudinal axis comprises a shank at one end and working end at the other. A flute portion is formed between the shank and working ends. The shank, working end and flute section are continuous with one another and are generally unitarily formed. The working end comprises a pilot tip with a first cutting portion. A second cutting portion is formed at the terminus of the flute portion and is axially spaced from the pilot tip's first cutting portion. The second cutting portion includes a pair of cutting edges on opposing sides of the pilot tip. Each of the second cutting edges is defined by a rake face on a surface of the flute adjacent the second cutting edge. A primary clearance face is adjacent with the second cutting edge. The second cutting edge is formed at the junction of the rake face and the primary clearance face. A secondary clearance face is continuous with the primary clearance face. The secondary clearance face is on an angle different from the primary clearance face and is at an angle of about 50° to 65° with respect to the longitudinal axis. A first clearance face of the first cutting portion is co-planar with the secondary clearance face. The first cutting portion includes a pair of inner and a pair of outer cutting edges. The inner cutting edges have a rake face which is co-planar with the secondary clearance face. The flute surface is on an angle of about 30° to 45° with respect to the longitudinal axis. The primary clearance face is on an angle with respect to a line transverse to the longitudinal axis from about 6° to 12°. Both of the second cutting edges are substantially on a plane which passes through the longitudinal axis.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is an elevation view of a drill bit according to the present invention.

FIG. 2 is a perspective view of a working end of a drill bit of FIG. 1 from one side.

FIG. 3 is an enlarged view of FIG. 2.

FIG. 4 is a top plan view of the drill bit of FIG. 1.

FIG. 5 is an enlarged side elevation view of the tip of FIG. 1.

FIG. 6 is an enlarged view of the tip of FIG. 5 rotated 90°.

FIG. 7 is a cross-section view through the drill bit of FIG. 6.

FIG. 8 is a schematic view of the taper of the bit.

DETAILED DESCRIPTION OF THE PREFERRED EMBODIMENTS

The following description of the preferred embodiment(s) is merely exemplary in nature and is in no way intended to limit the invention, its application, or uses.

Referring to FIG. 1, a drill bit 20 is shown for cutting a variety of material such as metal, wood, plastics, plastics, piping and tubing. The drill bit 20 has a longitudinal axis X-X and is manufactured from high-speed steel. The drill bit 20 has a shank end 22, a working end 24 and a fluted portion 26 interposed between the shank end 22 and the working end 24. The shank end 22 includes a substantially cylindrical shank 28 that extends from one end of the drill bit 20 to the fluted portion 26. The shank 28 connects to a tool holder (not shown) of a power tool. The shank 28 may have one or a plurality of axially parallel flat chamfers arranged equi-angularly around its circumference to improve the connection with a tool holder of a power tool.

The fluted portion 26 is formed with a pair of helical flutes 30 defined by a pair of helical lands 32 formed at a prescribed helix angle $\alpha$ measured with respect to the axis X-X. The helical flutes 30 and the helical lands 32 extend axially rearward from the working end 24 to the shank 28 and each have a pitch S. The pitch S is the linear distance on the drill bit between a full 360° revolution of the helixal land. The pitch S is controlled by the helix angle $\alpha$. The helix angle $\alpha$ falls within a range of about 30° to about 40°.

Referring to FIGS. 2 to 5, the working end 24 includes a flute cutting portion 34 with a major diameter D and a pilot tip 36 with a minor diameter d that is smaller than the major diameter D. The pilot tip 36 is formed integrally with and extends a short distance L1 axially ahead of the flute cutting portion 34. The pilot tip 36 has a split point cutting edge arrangement at its extreme end 38. The cutting edge arrangement is formed with a pair of inner cutting edges 40, 42 separated by a slight chisel edge 38 extending between the inner cutting edges 40, 42. The chisel edge 38 is perpendicular to the axis X-X. The split point is also formed with a pair of outer cutting edges 44, 46. Each outer cutting edge 44, 46 tapers radially outwardly from a respective inner cutting edge 40, 42 to the periphery of the minor diameter d of the pilot tip 36. The split point is also formed with a pair of primary clearance faces 48, 50. Each primary clearance face is formed behind a respective pair of leading inner and outer cutting edges 40, 44, 42, 46 (in the direction of rotation R) to provide relief behind these cutting edges. Each inner cutting edge 40, 42 forms a boundary between a leading rake face 52, 54 and a respective trailing primary clearance face 48, 50 (in the direction of rotation R).

The pilot tip 36 is also formed with a pair of rounded circumferential outer surfaces 56, 58. Each outer surface 56, 58 extend axially rearward on opposite sides of the pilot tip 36. The outer surface 56 is formed with a forward edge 60 and a trailing edge 62 (in the direction of rotation R). The outer surface 58 is formed with a forward edge 64 and a trailing edge 66 (in the direction of rotation R).

When viewed from above, as shown in FIG. 4, the outer surfaces 56, 58 are generally rounded but are also curved radially inwardly as the outer surfaces extend from a respective forward edge 60, 64 to a respective trailing edge 62, 66. This is clearly shown in FIG. 7, where the outer surfaces 56, 58 curves radially inwardly of a true circle represented by dashed line 68 thereby creating a radial relief RR. Accordingly, the outer surfaces 56, 58 each provide relief behind a respective forward edge 60, 64.

When viewed from the side, as shown in FIG. 5, the outer surfaces 58, 60 are generally straight but are also slightly tapered radially inwardly as the outer surfaces extend axially rearward. The rearward taper T of each outer surface 56, 58 are approximately 0.5° to 5° measured from a plane parallel to the axis X-X. Accordingly, the outer surfaces 56, 58 also provide relief behind the pilot tip 36.

Returning to FIGS. 2 to 5, the second cutting portion 34 is formed with a pair of second cutting edges 70, 72 at the terminus of the flute portion 26. Each second cutting edge 70, 72 has a respective trailing primary clearance face 74, 76 (in the direction of rotation R). Also, secondary clearance faces 75, 77 are continuous with the primary clearance faces 74, 76. The secondary clearance faces 75, 77 are angled with respect to the primary clearance faces 74, 76. The secondary clearance faces are on an angle from about 50° to about 65° with respect to the longitudinal axis. The secondary clearance faces 75, 77 are co-planar with the secondary clearance faces 49, 51 of the pilot point. Further, the secondary clearance faces 75, 77 are co-planar with the rake faces 41, 43 of the inner cutting edges 40, 42.

Each second cutting edge 70, 72 runs radially inwardly in a substantially straight line from the periphery of the major diameter D towards the pilot tip 36. The second cutting edges 70, 72 are substantially on a plane which passes through the longitudinal axis X-X. In the region adjacent the pilot tip 36, the second cutting edge 70 begins to curve towards the working end 24 to form a radius at a forward edge 78 of a fillet 80. The second cutting edge 70 merges with the forward edge 60 of the outer surface 56 at the fillet 80. Likewise, the second cutting edge 72 extends from the periphery of the major diameter D towards the pilot tip 36 and eventually curves in an identical manner into a radius at a forward edge 82 of a fillet 84. The second cutting edge 72 merges with the forward edge 64 of the outer surface 58 at the fillet 84.

Each fillet 80, 84 begins at a respective forward edge 78, 82 with a relatively large radius and extends rearward in a curved path from the respective forward edge 78, 82, wherein the radius becomes progressively smaller until each fillet terminates in an approximately right-angle shaped corner 86, 88, respectively. In addition, each fillet 80, 84 extends radially inward from the respective forward edge 78, 82 to a respective trailing corner 86, 88 in the same manner as the rounded outer surfaces 56, 58. Accordingly, the fillets 80, 84 create relief behind the forward edges 78, 82.

As discussed above, relief is provided behind the edges mentioned above. For example, the primary clearance face 74, the secondary clearance face 75 the fillet 80, and the outer surface 56, which trail, the second cutting edge 70, the fillet forward edge 78 and the pilot tip forward edge 60, respectively, create relief behind these edges in the manner described above. Thus, when the drill bit 20 is used to drill a hole in a workpiece, these trailing surfaces do not engage and rub against the walls of the hole. Similarly, the primary clearance face 76, secondary clearance face 77, the fillet 84, and the outer surface 58, which trail, the second cutting edge 72, the fillet forward edge 82 and the pilot tip forward edge 64, respectively, also create relief behind these edges. Thus, when the drill bit 20 is used to drill a hole in a workpiece, these trailing surfaces do not engage and rub against the walls of the hole.

As is shown in FIG. 2, each helical land 32 has a helical margin 90 on a leading edge 91 (in the direction of rotation R) of its circumferential outer face. The margin 90 protrudes radially slightly beyond the circumferential outer face of a respective land 26 and is narrower than the circumferential outer face. The helix defined by each margin 90 defines the major diameter D. The margins 90 engage the walls of the hole to provide support to the drill bit 20 as it drills into a workpiece. Friction between the walls of the hole and the drill bit 20 is thus reduced because the margins 90 have a smaller surface area than the circumferential outer faces of the lands 26.

Referring to FIG. 6, a primary clearance angle CA of each primary clearance face 74, 76 is measured from a plane perpendicular to the axis X-X. The primary clearance angle CA falls within a range of about 8° to about 12° for those drill bits with a major diameter D of less than 8 mm. The primary clearance angle CA falls within a range of about 6° to about 12° for those drill bits with a major diameter D of greater than 8 mm.

Each helical land 32 has an inner surface 92 that defines the shape of a respective flute 34. Each land inner surface 92 extends axially rearward from a respective outer cutting edge 44, 46 and a respective second cutting edge 70, 72. Each outer cutting edge 44, 46 forms a boundary between a respective land inner surface 92 and a respective primary clearance face 48, 50. Likewise, each second cutting edge 70, 72 forms a boundary between a respective land inner surface 92 and a respective primary clearance face 74, 76. The land inner surfaces 92 act as a rake face to both the outer cutting edges 44, 46 and the second cutting edges 70, 72. Accordingly, the land inner surfaces 92 each effectively have a rake face angle RA, as measured from a plane parallel to the axis X-X, that is equal to the helix angle α. The cutting angle of the second cutting edges 70, 74 equals 90°−(RA+CA). The cutting angle of the outer cutting edges 44, 46 equals 90°−(RA+the relief angle of the primary relief face 48, 50).

Referring to FIGS. 7 and 8, the drill bit 20 has a core, or web, 94 extending from the working end 24 to where the fluted section 26 joins the shank 28. The web 94 is defined by the helical lands 32. The web 94 is shown in dashed lines and tapers radially outwardly as it extends axially rearward from the working end 24. The web 94 has a thickness K at the pilot tip 36 and a thickness J near where the fluted section 26 joins the shank 28. The web 94 has a uniform web thickness taper rate along a length L2 between the pilot tip 36 and the point on the web 94 at which web thickness J is measured. The web thickness K is selected to provide suitably deep flutes 34 to convey, in use, debris and chips from the pilot tip 36 and out of the hole. The smaller the web thickness K the greater depth of the flutes 34 at the pilot tip 36. The web thickness J and the web length L2 are selected to provide a suitably robust drill bit 20 in its middle region.

Returning to FIG. 5, the split point cutting edge arrangement of the pilot tip 36 is formed with a point angle PP defined by inner cutting edges 40, 42. The pilot point angle PP falls within the range of 125° to 140°. The outer portion is formed with an outer point angle OP defined by the second cutting edges 70, 72 which falls within the range of about 120° to about 140° and preferably about 126° to about 136°. Accordingly, the second cutting edges are on an angle of about 22° to about 27° with respect to a line transverse to the X-X axis. The length L1 of the pilot tip 36 falls within the range of about 30% to about 45% of the major diameter D.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An elongated drill bit with a longitudinal axis comprising:
   a shank at one end;
   a working end at one end;
   a flute portion between said shank and working end, said shank, working end and flute section continuous with one another;
   the working end comprises a pilot tip with a first cutting portion having a rake face and a second cutting portion axially spaced from said pilot tip first cutting portion, said second cutting portion at a terminus of said flute portion, said second cutting portion includes a pair of cutting edges on opposing sides of said pilot tip;

said second cutting edge are on an angle of about 22° to about 27° from a line transverse to said longitudinal axis, said second cutting edge is formed at the junction of a rake face defined by a surface of said flute adjacent said cutting edge, and a primary clearance face, adjacent said second cutting edge, a secondary clearance face continuous with said primary clearance face, said rake face of said first cutting portion is co-planar with said secondary clearance face.

2. The drill bit according to claim 1, further comprising said secondary clearance face on an angle of about 50° to 65° with respect to said longitudinal axis.

3. The drill bit according to claim 2, wherein a clearance face of said first cutting portion is co-planar with said secondary clearance face.

4. The drill bit according to claim 1, wherein said flute surface is on an angle of about 30° to 40° with respect to said longitudinal axis.

5. The drill bit according to claim 4, wherein said primary clearance face is on an angle with respect to a line transverse to said longitudinal axis from about 8° to 12°.

6. An elongated drill bit with a longitudinal axis comprising:
- a shank at one end;
- a working end at one end;
- a flute portion between said shank and working end, said shank, working end and flute section continuous with one another;
- the working end comprises a pilot tip with a first cutting portion and a second cutting portion axially spaced from said pilot tip first cutting portion and at a terminus of said flute portion, said second cutting portion includes a pair of cutting edges on opposing sides of said pilot tip;
- each said second cutting edge defined by the junction of a rake face, on a surface of said flute, and a primary clearance face, adjacent said second cutting edge;
- and a secondary clearance face continuous with said primary clearance face, said secondary clearance face on an angle of about 50° to 65° with respect to said longitudinal axis and said secondary clearance face co-planar with a rake face of said first cutting portion.

7. The drill bit according to claim 6, wherein said first cutting portion includes a pair of inner and a pair of outer cutting edges.

8. The drill bit according to claim 6, wherein said flute surface is on an angle of about 30° to 40° with respect to said longitudinal axis.

9. The drill bit according to claim 8, wherein said primary clearance face is on an angle with respect to a line transverse to said longitudinal axis from about 80° to 12°.

10. An elongated drill bit with a longitudinal axis comprising:
- a shank at one end;
- a working end at one end;
- a flute portion between said shank and working end, said shank, working end and flute section continuous with one another;
- the working end comprises a pilot tip with a first cutting portion and a second cutting portion axially spaced from said pilot tip first cutting portion, said second cutting portion at a terminus of said flute portion, said second cutting portion includes a pair of cutting edges on opposing sides of said pilot tip, said second cutting edges are substantially on a plane passing through said longitudinal axis;
- said second cutting edge are on an angle of about 22° to about 27° from a line transverse to said longitudinal axis, said second cutting edge is formed at the junction of a rake face defined by a surface of said flute adjacent said cutting edge, and a primary clearance face, adjacent said second cutting edge.

11. An elongated drill bit with a longitudinal axis comprising:
- a shank at one end;
- a working end at one end;
- a flute portion between said shank and working end, said shank, working end and flute section continuous with one another;
- the working end comprises a pilot tip, with a first cutting portion and a second cutting portion axially spaced from said pilot tip first cutting portion and at a terminus of said flute portion, said second cutting portion includes a pair of cutting edges on opposing sides of said pilot tip, both said second cutting edges are substantially on a plane passing through said longitudinal axis;
- each said second cutting edge defined by the junction of a rake face, on a surface of said flute, and a primary clearance face, adjacent said second cutting edge; and
- a secondary clearance face continuous with said primary clearance face, said secondary clearance face on an angle of about 50° to 65° with respect to said longitudinal axis.

* * * * *

UNITED STATES PATENT AND TRADEMARK OFFICE
CERTIFICATE OF CORRECTION

| | |
|---|---|
| PATENT NO. | : 7,520,703 B2 |
| APPLICATION NO. | : 11/268701 |
| DATED | : April 21, 2009 |
| INVENTOR(S) | : Markus Rompel |

It is certified that error appears in the above-identified patent and that said Letters Patent is hereby corrected as shown below:

Column 7,
Line 14, "cuffing" should be --cutting--.
Line 32, "cuffing" should be --cutting--.
Line 34, "cuffing" should be --cutting--.
Line 36, "cuffing" should be --cutting--.
Line 44, "cuffing" should be --cutting--.

Column 8,
Line 3, "80°" should be --8°--.
Line 13, "cuffing" should be --cutting--.
Line 15, "cuffing" (both occurrences in patent) should be --cutting--.
Line 16, "cuffing" should be --cutting--.
Line 19, "cuffing" should be --cutting--.
Line 21, "cuffing" should be --cutting--.
Line 24, "cuffing" should be --cutting--.
Line 34, "cuffing" should be --cutting--.
Line 35, "cuffing" should be --cutting--.
Line 37, "cuffing" should be --cutting--.
Line 39, "cuffing" should be --cutting--.

Signed and Sealed this

Twenty-eighth Day of July, 2009

JOHN DOLL
*Acting Director of the United States Patent and Trademark Office*